United States Patent [19]

Matsui

[11] Patent Number: 5,757,746
[45] Date of Patent: May 26, 1998

[54] METHOD AND APPARATUS FOR CONTROLLING TRACK KICK FOR OPTICAL DISK DRIVE

[75] Inventor: Tsutomu Matsui, Tokyo, Japan

[73] Assignee: NEC Corporation, Tokyo, Japan

[21] Appl. No.: 613,182

[22] Filed: Mar. 8, 1996

[30] Foreign Application Priority Data

Mar. 9, 1995 [JP] Japan .................... 7-049707

[51] Int. Cl.$^6$ .................................. G11B 7/085
[52] U.S. Cl. .................. 369/44.28; 369/44.29; 369/44.37
[58] Field of Search .............. 369/44.25, 44.29, 369/44.35, 44.37, 44.41, 44.42, 44.26, 44.34, 44.28

[56] References Cited

U.S. PATENT DOCUMENTS

| | | | |
|---|---|---|---|
| 5,121,375 | 6/1992 | Kuribayashi | 369/44.35 |
| 5,179,545 | 1/1993 | Tanaka et al. | 369/44.25 |
| 5,218,584 | 6/1993 | Gfeller . | |
| 5,615,185 | 3/1997 | Horikiri | 369/44.29 |

FOREIGN PATENT DOCUMENTS

| | | | |
|---|---|---|---|
| 6-84172 | 3/1994 | Japan . | |
| 06282859 A | 10/1994 | Japan | 369/44.41 |

OTHER PUBLICATIONS by Saito, A. et al., "1/8 Track Pitch Positioning Method for Optical Disk Drive", *Central Research Laboratory*, C-384, 1994, p. 62.

by Wakabayashi, K. et al., "High Density Optical Disk using Lattic Recording", *Central Research Laboratory*, C-507, 1994, pp. 5-74.

by Sugiyama, H. et al., "Proposal of 2-Dimensional Lattice Recording for High Density on Optical Disk", *Central Research Laboratory*, C-508, 1994, pp. 5-75.

*Primary Examiner*—Thang V. Tran
*Attorney, Agent, or Firm*—Young & Thompson

[57] ABSTRACT

A matrix circuit receives, as inputs, signals after opto-electrical conversion of reflected light of three light beams of the plus first, 0-th and minus first order light beams from the optical disk. Based on the signals, four tracking error signal are produced by the matrix circuit. Zero cross calculator detects zero cross points of the four tracking error signals, whereby movement of the beam spot formed of the light beams is monitored with points at ¼, ²⁄₄, ¾ and ⁴⁄₄ of a track pitch. Here, recording or reproduction is performed on both lands and grooves. The mute state of a tracking servo is released at a timing when the beam spot passes through a point at ²⁄₄ of the track pitch and the polarity of the tracking servo is changed over at this timing.

13 Claims, 5 Drawing Sheets

FIG. 6A $TE3 = f(x) - f(x - \frac{P}{4})$
$TE4 = TE3(x) - TE1(x)$

FIG. 6B $TE1 = f(x + \frac{P}{4}) - f(x)$
$TE2 = f(x + \frac{P}{4}) - f(x - \frac{P}{4})$

METHOD AND APPARATUS FOR CONTROLLING TRACK KICK FOR OPTICAL DISK DRIVE

BACKGROUND OF THE INVENTION

1. Field of the Invention

The present invention relates to a method and apparatus for controlling a track kick for an optical disk drive, and, more particularly, to a method and apparatus for controlling a track kick for an optical disk drive suitable for changing tracks following a changeover between a land and a groove.

2. Description of the Related Art

There is a demand for an external storage device which has both high speed accessibility and high storage capacity. For such external storage device, the optical disk drive is a promising candidate in view that it satisfies requirements such as high transfer rate, high speed random accessing, and high storage capacity. The optical disk is, further, an excellent medium in terms of preservation and durability because of its non-contact feature.

In performing high density recording on an optical disk, it is effective to increase the recording density not only in the tangential direction of the disk but also in its radial direction. Grooves are engraved in the surface of the optical disk with a predetermined spacings while the regions between the grooves are called lands. It is desirable to perform high density recording by making the width of groove and that of land substantially equal, and placing recorded marks on both of the lands and grooves in which information is recorded. It is also designed to improve the recording density by narrowing the pitch between tracks as possible.

When the pitch between tracks is made narrower and narrower, a diffraction angle by the track on the disk is increased unless the numerical aperture of an objective lens disposed for focusing light beam on the recorded mark is increased. When the diffraction angles are increased, the signal to noise ratio (S/N) of the tracking error signal itself for detecting tracking error deteriorates so that good tracking servo cannot be attained.

Furthermore, in order to perform recording or reproduction on both the land and the groove, it is necessary to record or reproduce information by sequentially changing over the lands and the grooves. Because the polarities of tracking error signals are opposite in tracking the lands and the grooves, it is necessary to reverse the polarity of the tracking servo at the same time that the track kick changes over to the next track.

Figure 1A:
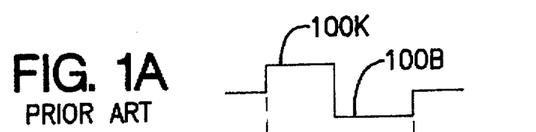
FIG. 1A is a waveform diagram showing a track kick pulse and a brake pulse.
Figures 1B, 1C:
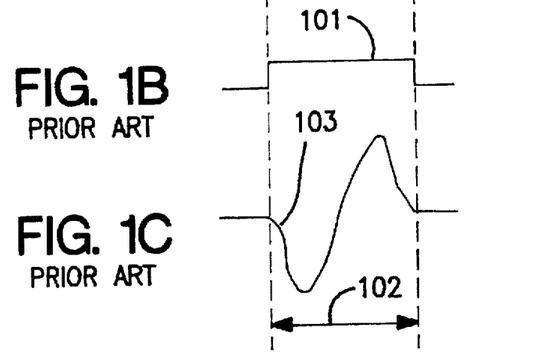

A conventional method for controlling a track kick on an optical disk will be described with reference to FIG. 1A to 1C. Referring to FIG. 1A, a track kick pulse 100K and a brake pulse 100 B are formed as continuous waves of positive and negative pulses. The track kick pulse 100K is a driving pulse for moving an objective lens toward the inside of the disk and the brake pulse 100 B is a driving pulse for moving the objective lens toward the outside of the disk. A tracking servo is released with a duration 102 in which a mute signal 101 shown in FIG. 1B is provided so that a tracking error signal 103 is formed as an S-shaped curve as shown in FIG. 1C.

The tracking error signal 103 is formed by radiating on an optical disk a 0-th order diffracted light beam, and plus and minus first order diffracted light beams all of which are produced by a diffraction grating, and by subtracting the reflected light beam of the plus and minus diffracted light beams from the disk.

In a device performing tracking only for the land or groove, it is relatively easy to perform such control where a beam spot for information is moved from a track to the next. However, in case where both lands and grooves are recorded and used, it is necessary to move the beam spot to an intermediate point between the lands or grooves for reading information as disclosed in Japanese Laid-Open Patent Application No. Hei 6-84172.

SUMMARY OF THE INVENTION

An object of the present invention is to provide a method and apparatus for controlling a track kick action for an optical disk easily and surely capable of performing a track kick action wherein a beam spot is changed over from a land to a groove or vice versa.

Another object of the present invention is to provide a method and apparatus for controlling a track kick action for an optical disk capable of changing over a polarity of a tracking servo and releasing a mute state of the tracking servo at suitable timing.

To achieve the above objects, the method for controlling a track kick action for an optical disk of the present invention contemplates focussing three light beams of a 0-th order and, plus and minus first order diffracted beams on a track. Then, reflected lights from the three beams from the track are converted into electrical signals. Movement of the three beams in a radial direction of an optical disk is monitored according to the electrical signals. The mute state of a tracking servo is released at timing determined according to the movement of the three beams and the polarity of the tracking servo is changed over at the timing.

Further, to achieve the above objects, an apparatus for controlling a track kick action for an optical disk of the present invention comprises focusing means for focusing three light beams of a 0-th order and, plus and minus first order diffracted beams on a track, a convertor for converting reflected light of the three beams from the track into electrical signals, a monitor for monitoring movement of the three beams in a radial direction of the optical disk according to the electrical signals, a returning means for returning the tracking servo, which is released when a track kick is started, at timing determined according to the movement of the three beams and polarity changing means for changing over the polarity of the tracking servo at the timing.

BRIEF DESCRIPTION OF THE DRAWINGS

This above-mentioned and other objects, features and advantages of this invention will become more apparent by reference to the following detailed description of the invention taken in conjunction with the accompanying drawings, wherein;

FIG. 1A to 1C are waveform diagrams showing the relationship between a tracking error signal and a muting signal in a conventional method for controlling a track kick action for an optical disk. In particular.

FIG. 1B is a waveform diagram showing a mute signal during which the tracking servo is released;

FIG. 1C is a waveform diagram showing a tracking error signal;

3

DETAILED DESCRIPTION OF THE PREFERRED EMBODIMENT

Now, the preferred embodiment of the present invention will be described with reference to FIG. 2 to FIG. 8.

In moving the beam spot to an intermediate point between the lands or grooves, it is necessary to monitor the track kick action itself in order to accurately change over from the land to the groove or vice versa every lap. That is, it is necessary to suitably determine timings when the polarity of the tracking servo is changed over and the mute of the tracking servo is released. Therefore, in this embodiment of the present invention, the monitoring of the movement of the beam spot formed of the light beam, the detection of timing when the muting of the tracking servo is released and the polarity of the tracking servo is changed over are performed using all of the 0-th order and, plus and minus first order diffracted light beams.

Figure 2:
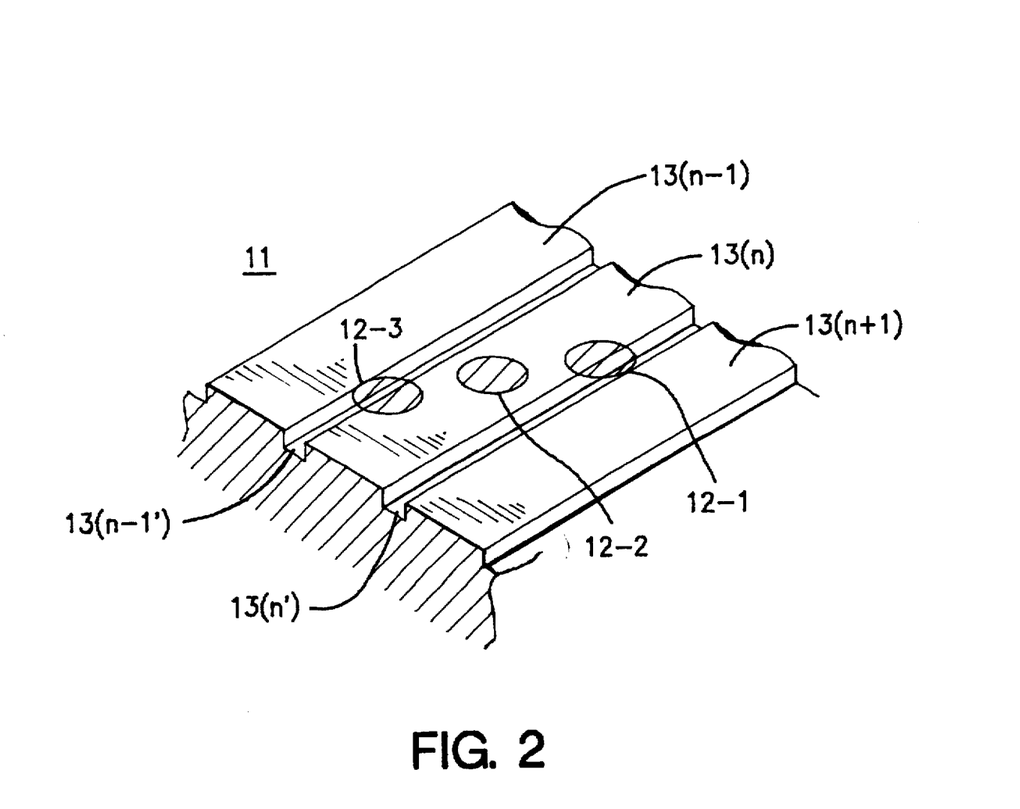
FIG. 2 is a sectional view showing a state where three light beams are projected on the surface of an optical disk according to an embodiment of the present invention.

Referring to FIG. 2, three light beams are projected on the surface of an optical disk 11. A track kick control device in an embodiment turns a laser beam emitted from a semiconductor laser into parallel light beams by a collimator lens, and projects them on a diffraction grating to produce 0-th order and, plus and minus first order diffracted light beams. The three light beams 12-1, 12-2 and 12-3 are focused by an objective lens on an optical disk 11.

4

Here, the first light beam 12-1 is the plus first order diffracted light beam, the second light beam 12-2 is the 0-th order diffracted light beam, the third light beam 12-3 is the minus first order light beam. These first to third light beams 12-1, 12-2 and 12-3 irradiate a land 13(n) on the disk 11.

It is assumed that reflected outputs of the light beams 12-1, 12-2 and 12-3 from the track are f(x+P/4), f(x), and f(x−P/4), respectively, where reference p represents a track pitch as spacing between the previous and following tracks on which information is recorded. Four tracking error signals TE1 to TE4 are produced according to the reflected outputs f(x+P/4), f(x), and f(x−P/4), and used for controlling tracking and the track kick. These tracking error signals TE1 to TE4 can be expressed by the following equations (1)–(4), which are disclosed by Saito et al. in "Electronic information and communication society of 1994, C-3.84, ⅛ Track Pitch Positioning Method for Optical Disk Drive".

$$TE1(x)=f(x+P/4)-f(x) \quad (1)$$

$$TE2(x)=f(x+P/4)-f(x-P/4) \quad (2)$$

$$TE3(x)=f(x)-f(x-P/4) \quad (3)$$

$$TE4(x)=TE3(x)-TE1(x) \quad (4)$$

Figure 3:
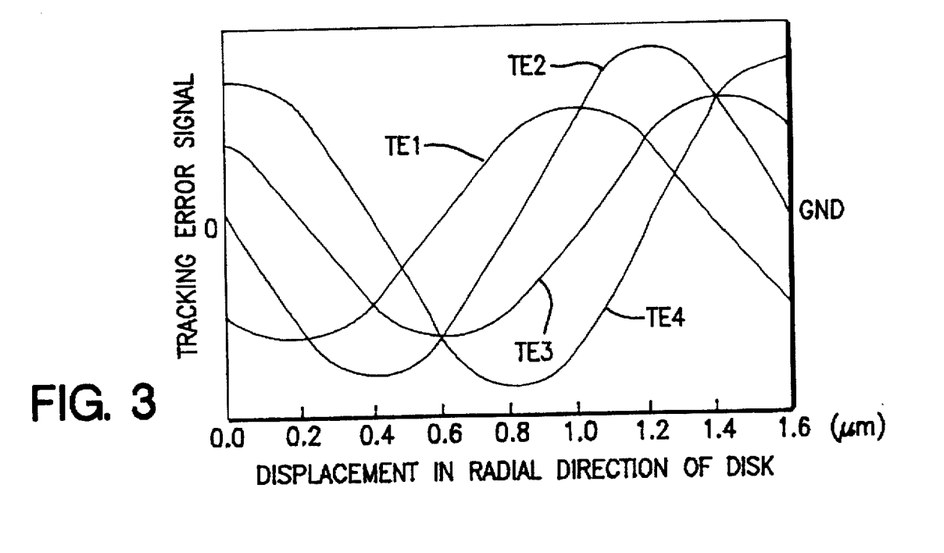
FIG. 3 is a graph depicting characteristic curves illustrating the relationship between tracking error signals TE1 to TE4 and displacement in the radial direction of the disk when a track pitch is 1.6 μm.

The relationship between tracking error signals TE1 to TE4 and displacement in the radial direction of the disk wherein a track pitch is 1.6 μm is shown in FIG. 3. In the FIG. 3, the abscissa represents displacement in the radial direction of the disk, and only the tracking error signal TE2 indicated by a thick line corresponds to the conventional tracking error signal. Conventionally, tracking is controlled only for a land or groove using three light beams of the plus first, 0-th, and minus first order diffracted light beams, in which the tracking error signal is calculated by subtracting the reflected outputs of the plus and minus first order diffracted light beams.

In the conventional track kick action using the tracking error signal, the read-out spot would move 1.6 μm on the optical disk 11 for one cycle of the tracking error signal TE2. However, in the conventional track kick action, the movement of the beam spot can be monitored with a detailed pitch in the radial direction of the disk. On the other hand, in the embodiment of the present invention, four tracking error signals TE1 to TE4 are obtained using the three light beams of the plus first, 0-th, and minus first order diffracted light beams so that the movement of the beam spot can be monitored within substantially ⅛ of the track pitch P by detecting zero cross point (GND) of the tracking error signals.

Figure 4:
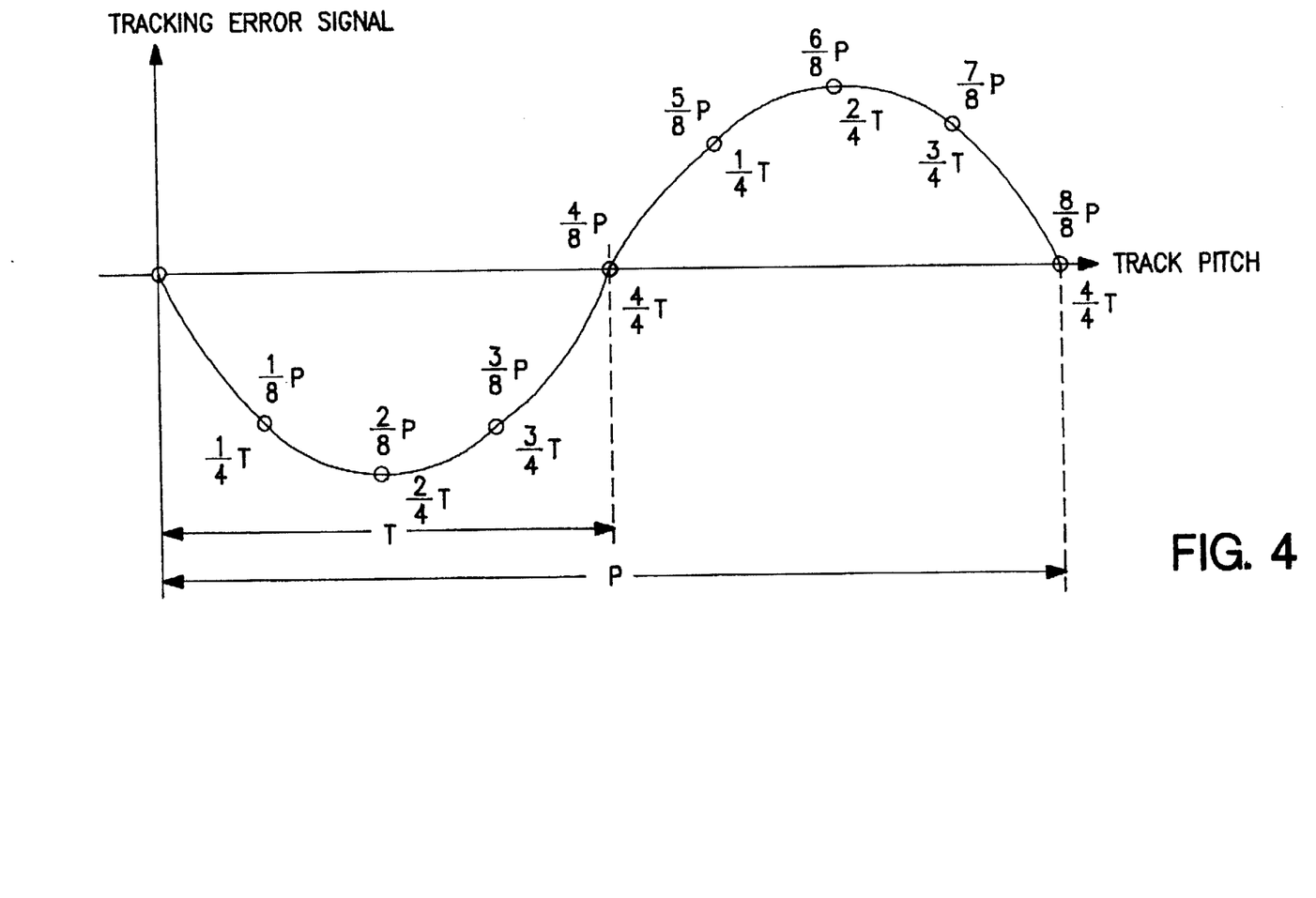
FIG. 4 is a waveform diagram illustrating features of a tracking error signal of an embodiment of the present invention.

The track kick action should be completed in one half cycle of a tracking error signal in which recording is performed on both lands and grooves and reproduction is performed for them. Therefore, it is necessary to monitor the movement of the beam spot formed of the light beam for performing the stable track kick action. As shown in FIG. 4, in changing over from the land to the groove or vice versa, the movement of the beam spot can be monitored with substantially ¼ of the track pitch T using the tracking error signal TE1 to TE4. Here, reference T represents half of a track pitch P which represents the sum of the widths of a land and a groove.

Next, a track kick action for changing over from a land to the adjacent groove in the embodiment will be described with reference to FIG. 5A to 5F and FIG. 6A and 6B.

Figure 5A:
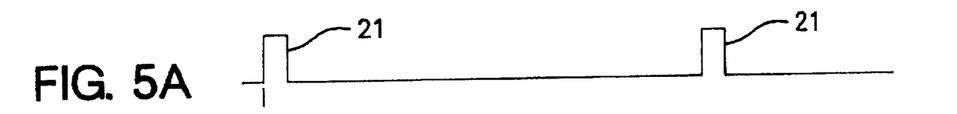
FIG. 5A is a waveform diagram showing timing when a frame pulse is generated.

Referring to FIG. 5A, one frame pulse 21 per revolution of the optical disk is generated.

Figure 5B:
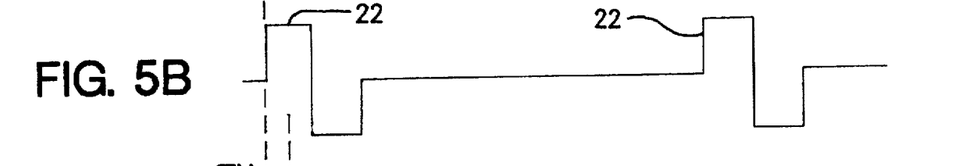
FIG. 5B is a waveform diagram showing a drive current for applying positive and negative pulses to perform kick-brake control on a tracking actuator.

Referring to FIG. 5B, a drive current 22 for applying positive and negative pulses to perform kick-brake control on a tracking actuator is generated according to the frame pulse 21. Here, the positive pulse is the track kick pulse for moving the objective lens toward the inside of the disk and the negative pulse is the brake pulse for moving the objective lens toward the outside of the disk. Every time one frame pulse 21 is generated, the kick action would be performed according to the positive and negative pulses. That is, the waveform of the drive current 22 shown in FIG. B is a kick drive waveform for causing the kick action.

Figure 5C:
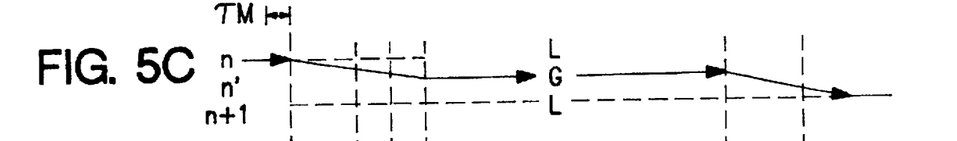
FIG. 5C is a waveform diagram showing movement of the light beam in a land-groove change-over mode where the land and groove are changed over.

Movement of the light beam in a land-groove change-over mode where the land and groove are changed over is shown in FIG. 5C. When the light beam proceeds from the n-th track to the (n+1)-th track, change-over is alternately performed from a land to a groove or vice versa in one revolution of the optical disk. Referring to FIG. 5C, the change-over is performed from the n-th land 13(n) to the n'-th groove 13(n') between the n-th land 13(n) and the (n+1)-th land 13(n+1), then from the n'-th groove 13(n') to the (n+1)-th land 13(n+1). Here, in the FIG. 5C, the reference "G" represents a groove, while "L" represents a land.

Figure 5D:
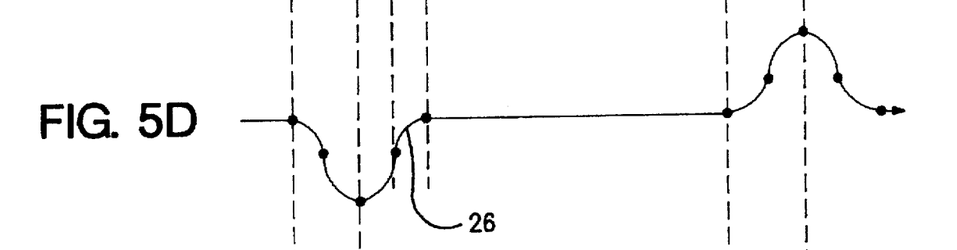
FIG. 5D is a waveform diagram showing a tracking error signal in the land-groove change-over mode.

Referring to FIG. 5D, a tracking error signal 26 in the embodiment where the land and groove are changed over is obtained. Here, the tracking error signal 26 is generated with delay of a mechanical time lag $\tau_M$ from the rising edge of the waveform of the drive current 22. The tracking error signal 26 is obtained according to the reflected outputs of the three beams from the disk in the state wherein the tracking servo is released. When the light beam proceeds to the point at ½ of the track pitch T, the polarity of the tracking error signal 26 is instantaneously changed. The tracking servo is released during the interval until the light beam proceeds to the point at ½ of the track pitch T, and again applied at the moment when the light beam passes the point at ½ of the track pitch T.

Figure 5E:
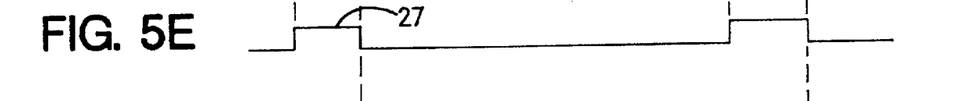
FIG. 5E is a waveform diagram showing a muting signal.

Referring to FIG. 5E, a muting signal 27 is generated during an interval from the start of the track kick action to the time when the light beam passes the point at ½ of the track pitch T. The tracking servo is released in the interval when the muting signal 27 exists.

Figure 5F:
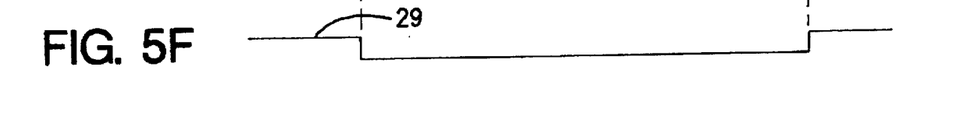
FIG. 5F is a waveform diagram showing timing when the polarity of a tracking servo is changed over.
Figure 6A:
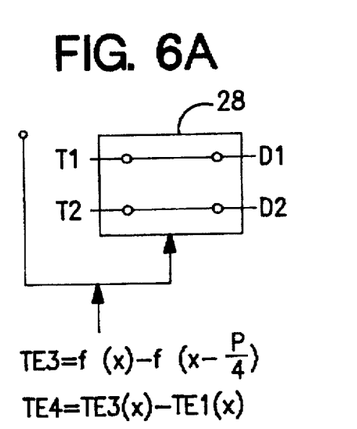
FIG. 6A is a diagram showing a constitution of a switch box for changing over the polarity of the tracking servo in a first state.
Figure 6B:
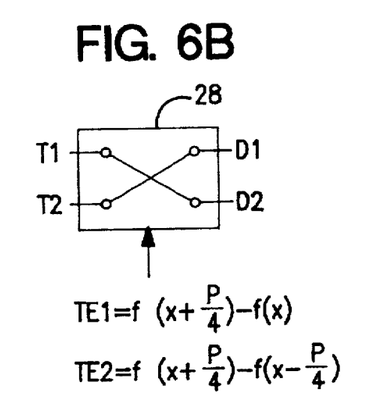
FIG. 6B shows the switch box of FIG. 6A in a second state.

Referring to FIG. 5F, the polarity of the tracking error signal, that is, the polarity of the tracking servo is changed over at the timing when the light beam passes the point at ½ of the track pitch T. Referring to FIG. 6A and 6B, the internal connections in the switch box 28 are changed between the two input terminals T-1 and T-2, and the two output terminals D-1 and D-2 according to the tracking error signal. The switch box 28 is used for changing over the polarity of the tracking servo.

Next, the track kick action in the still mode will be described with reference to FIG. 7A and 7B.

Figure 7A:
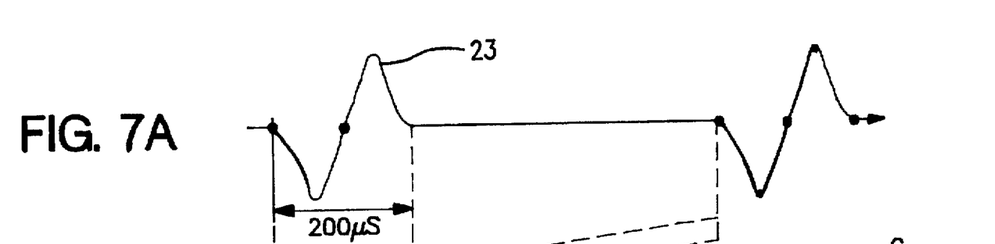
FIG. 7A is a waveform diagram showing movement of the light beam in a still mode where a beam spot is repeated on a same land or groove.

Referring to FIG. 7A, the light beam moves from the (n+1)-th land 13(n+1) to the n-th land 13 (n) in the still mode. The track kick action is first performed to the n-th land 13 (n) on only one inner periphery of the optical disk 11 from the (n+1)-th land 13 (n+1). Then, when the optical disk 11 makes one full rotation and the light beam reaches the (n+1)-th land 13 (n+1) again, further track kick action is performed in the same manner. Thus, in the still mode, the beam spot formed of the light beam is repeated on the n-th land 13 (n). Here, in the still mode, the beam spot may be repeated on the n'-th groove 13(n').

Figure 7B:
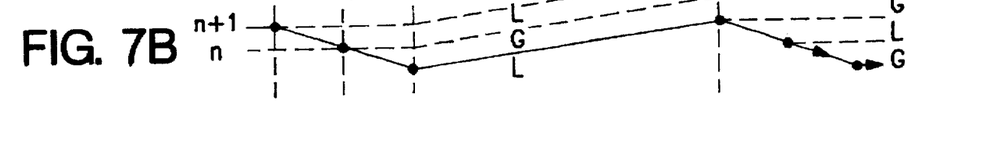
FIG. 7B is a waveform diagram showing a tracking error signal in the still mode;.

Referring to FIG. 7B, when the track kick action is performed in the still mode, a tracking error signal 23 is generated with the S-shaped waveform. The S-shaped tracking error signal 23 has a kick width (one cycle) of about 200 µS. The tracking error signal 23 takes the S-shape because the polarity of the tracking error signal is reversed when the track kick proceeds by ¼ of the track pitch P, the track kick proceeds until ¾ of the track pitch P in this state, and subsequently the polarity returns to the original one.

Next, the circuit for performing the track kick action of the embodiment of the present invention will be described with reference to FIG. 8.

Figure 8:
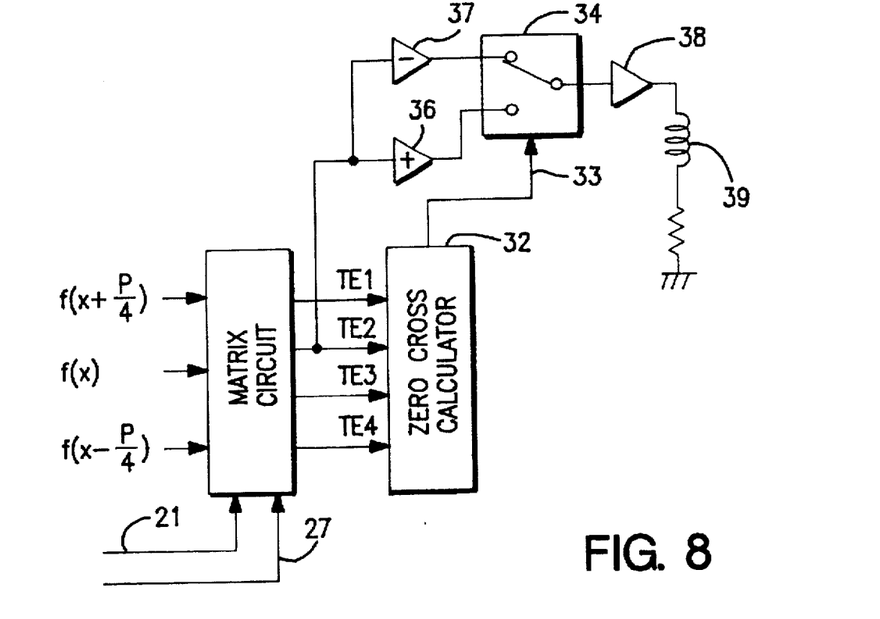
FIG. 8 is a circuit diagram showing a constitution of an embodiment of the present invention.

Referring to FIG. 8, a matrix circuit 31 receives as inputs the reflected outputs f (x+P/4), f (x), and f (x–P/4) of the respective light beams 12-1, 12-2, and 12-3 from the disk, the frame pulse 21, and the muting signal 27. The matrix circuit 31 outputs the tracking error signals TE1 to TE4 obtained by calculation of the equations (1)–(4). These tracking error signals TE1 to TE4 are input into a zero cross calculator 32 where every timing when the light beam passes respective points at ¼, ²⁄₄, ¾ and ⁴⁄₄ of the track pitch T are detected by detecting the zero cross points of the tracking error signal TE1 to TE4. Then, the zero cross calculator 32 checks the tracking error signal levels at these timings, and supplies a change-over control signal 33 to the switch box 34 at the detected timing.

In addition, the tracking-error signal TE2 is input into both a positive amplifier 36 and a negative amplifier 37 which are provided for changing over the polarity of the signal. Outputs of these amplifiers 36 and 37 are input into two input terminals of the switch box 34 as an analog switch. Either one of the outputs of the amplifiers 36 and 37 is selected by the change-over control signal 33, and supplied to a tracking drive amplifier 38. A tracking coil 39 is disposed at the output of the tracking drive amplifier 38, and arranged to be excited in movement control for the track.

Thus, every timing when the 0-th order and, plus and minus first order diffracted light beams pass through respective points at ¼, ²⁄₄, ¾ and ⁴⁄₄ of the track pitch T corresponding to the zero cross points of the four tracking error signals TE1 to TE4 is detected. Then, the tracking servo is returned from a mute state which is released at the start of the track kick action, at timing when the three light beams pass through the point at ½ of the track pitch T and further the polarity of the tracking servo is changed over at the same timing. Therefore, it is possible to perform a stable and accurate track kick action from a land to a groove, or vice versa.

Figure 9A:
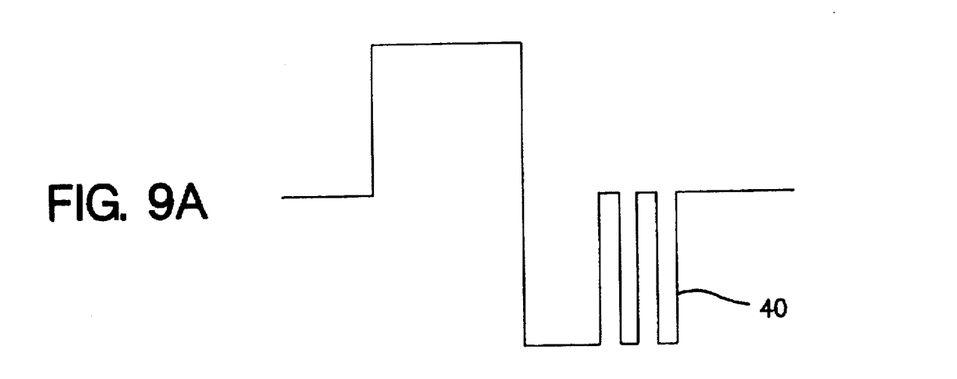
FIG. 9A is a waveform diagram showing an additional driving pulse provided with a tracking coil shown in FIG. 8.

Furthermore, in the case where a period when the brake pulse is generated is short, the track kick action can not stably performed because the beam spot can not land on the desired position of the optical disk. Now, the additional pulse 40 is applied to the brake pulse as shown in FIG. 9A so as to obtain the suitable braking period. That is, the pulse width modulation (PWM) is applied to the brake pulse.

Figure 9B:
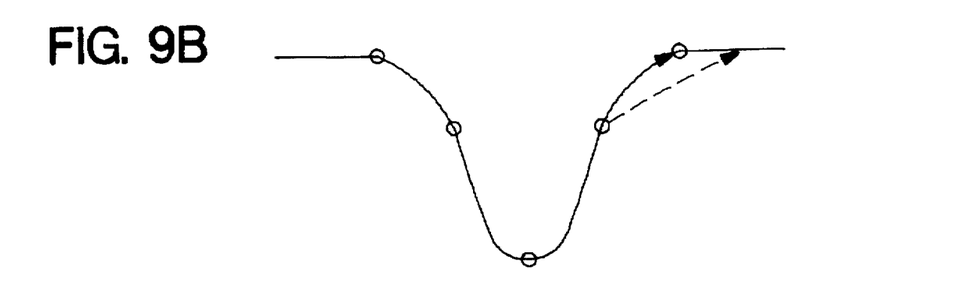
FIG. 9B is a waveform diagram showing a tracking error signal when the additional driving pulse is provided with the tracking coil.

When the tracking error signal level does not reach a suitable level at the point where the beam spot reaches at ¾ of the track pitch T, the brake pulse is increased by driving the PWM so that the broken line shown in FIG. 9B is corrected into the solid line. Therefore, the period of the track kick action can be suitably adjusted. Here, the track kick action where the changing-over is performed the land to groove is shown in FIG. 9A and 9B.

It is apparent that the present invention is not limited to the above embodiment but may be modified and changed without departing from the scope and spirit of the present invention.

What is claimed is:

1. An apparatus for controlling a track kick for an optical disk drive comprising:
    focusing means for focusing three light beams of a 0-th order and, plus and minus first order diffracted beams on a track;

convertor means for converting reflected light of said three beams from said track into electrical signals;

monitor means for monitoring movement of said three beams in a radial direction of an optical disk according to said electrical signals, said monitor means for detecting when said beams pass ¼, ¾, ¾ and ⁴⁄₄ of a pitch of the track;

returning means for returning a tracking servo, which is released when a track kick is started, at a first timing determined according to said movement of said three beams; and polarity changing means for changing a polarity of said tracking servo at said first timing.

2. The apparatus as claimed in claim 1, wherein said monitor means comprises subtraction means for performing subtraction of said electrical signals and a detector means for detecting zero cross points of signals output from said substraction means, and said first timing being determined according to a timing when said zero cross point is detected by said detector means.

3. The apparatus as claimed in claim 1, wherein said returning means returns said tracking servo at a second timing when said beams passes through a point at ¾ of said track pitch and said polarity reversing means reverses said polarity of said tracking servo at said second timing.

4. An apparatus for controlling a track kick for an optical disk drive comprising:

focusing means for focusing three light beams of a 0-th order and, plus and minus first order diffracted beams on a track;

convertor means for converting reflected light of said three beams from said track into electrical signals;

monitor means for monitoring movement of said three beams in a radial direction of an optical disk according to said electrical signals, said monitor means comprising generator means for generating a first signal obtained by subtraction of said electrical signals corresponding to said plus first and 0-th order diffracted beams, a second signal obtained by subtraction of said electrical signals corresponding to said 0-th and minus first order diffracted beams, and a third signal obtained by subtraction of said second and first signals, and a detector for detecting a zero cross point of said third signal, and said first timing being determined according to a timing when a zero cross point of said third signal is detected by said detector;

returning means for returning a tracking servo, which is released when a track kick is started, at a first timing determined according to said movement of said three beams; and polarity changing means for changing a polarity of said tracking servo at said first timing.

5. The apparatus as claimed in claim 4, wherein said generator means generates a second signal obtained by subtraction of said electrical signals corresponding to said plus and minus first order diffracted beams.

6. A method for controlling a track kick for an optical disk drive comprising the steps of:

focusing three light beams of a 0-th order and, plus and minus first order diffracted beams on a track;

converting reflected beam of said three beams from said track into electrical signals;

monitoring movement of said three beams in a radial direction of an optical disk according to said electrical signals, including detecting when said beams pass ¼, ¾, ¾ and ⁴⁄₄ of a pitch of the track;

returning a tracking servo, which is released when a track-kick is started, at a first timing determined according to said movement of said three beams; and reversing polarity of said tracking servo at said first timing.

7. The method as claimed in claim 6, further comprising the steps of:

performing at least one subtraction of said electrical signals; and detecting a zero cross point of signals output from said subtraction of said electrical signals, and wherein said first timing is determined according to timing when said zero cross point is detected.

8. The method as claimed in claim 6, wherein said tracking servo is returned at a second timing when said beams pass a point at ¾ of said track pitch, and wherein said polarity of said tracking servo is reversed at said second timing.

9. A method for controlling a track kick for an optical disk drive comprising the steps of:

focusing three light beams of a 0-th order and, plus and minus first order diffracted beams on a track;

converting reflected beam of said three beams from said track into electrical signals;

monitoring movement of said three beams in a radial direction of an optical disk according to said electrical signals, generating a first signal obtained by subtraction of said electrical signals for said plus first and 0-th order diffracted beams, a second signal obtained by substraction of said 0-th and minus first order diffracted beams, and a third signal obtained by subtraction of said second and first signals;

returning a tracking servo, which is released when a track-kick is started, at a first timing determined according to said movement of said three beams;

detecting a zero cross point of said third signal;

reversing polarity of said tracking servo at said first timing;

and wherein said first timing is determined according to timing when said zero cross point is detected.

10. The method as claimed in claim 9, wherein said generating step generates a second signal obtained by subtraction of said plus and minus first order diffracted beams.

11. An apparatus for controlling a track kick where a beam spot formed of a light beam is moved from a land to a groove or vice versa on an optical disk, comprising:

a focusing mechanism for focusing three light beams of a 0-th order and, plus and minus first order diffracted beams on a track;

a convertor for converting reflected beam of said three beams from said track into electrical signals;

a generating circuit coupled to an output of said convertor, for generating tracking error signals obtained by subtraction for said electrical signals;

a detector coupled to an output of said generating circuit, for detecting a zero cross point of at least one of said tracking error signals;

a positive amplifier coupled to an output of said generating circuit for positively amplifying said tracking error signals;

a negative amplifier coupled to said output of said generating circuit for negatively amplifying said tracking error signal negatively; and a switching circuit for outputting one of a signal output from said positive amplifier and a signal output from said negative amplifier at timing when said zero cross point is detected by said detector.

12. The apparatus as claimed in claim 11, further comprising:

a tracking drive amplifier coupled to an output of said switching circuit; and a tracking coil coupled to an output of said tracking drive amplifier, said tracking coil being excited for a track kick by said tracking error signal from said switching circuit.

13. The apparatus as claimed in claim 12, wherein an additional drive pulse is applied to said tracking coil.

* * * * *